(12) United States Patent
Song

(10) Patent No.: US 11,079,750 B2
(45) Date of Patent: Aug. 3, 2021

(54) CONTROL METHODS AND APPARATUSES BASED ON HEADLESS MODE FOR UNMANNED AERIAL VEHICLE

(71) Applicant: SZ DJI TECHNOLOGY CO., LTD., Shenzhen (CN)

(72) Inventor: Jianyu Song, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 443 days.

(21) Appl. No.: 15/816,455

(22) Filed: Nov. 17, 2017

(65) Prior Publication Data
US 2018/0074487 A1 Mar. 15, 2018

Related U.S. Application Data

(63) Continuation of application No. PCT/CN2015/079191, filed on May 18, 2015.

(51) Int. Cl.
*G05D 1/00* (2006.01)
*B64C 39/02* (2006.01)
*G01C 21/16* (2006.01)

(52) U.S. Cl.
CPC ......... *G05D 1/0016* (2013.01); *B64C 39/024* (2013.01); *G01C 21/165* (2013.01); *G05D 1/0033* (2013.01); *B64C 2201/146* (2013.01)

(58) Field of Classification Search
None
See application file for complete search history.

(56) References Cited

U.S. PATENT DOCUMENTS

| 8,200,375 B2 * | 6/2012 | Stuckman ............... A63H 27/12 701/2 |
| 2003/0212478 A1 * | 11/2003 | Rios ..................... G05D 1/0044 701/2 |
| 2009/0087029 A1 * | 4/2009 | Coleman ............ G06K 9/00208 382/103 |
| 2009/0204276 A1 * | 8/2009 | Stuckman ............... A63H 27/12 701/2 |

(Continued)

FOREIGN PATENT DOCUMENTS

CN 102561700 A 7/2012
CN 103344250 A 10/2013

(Continued)

OTHER PUBLICATIONS

World Intellectual Property Organization (WIPO) International Search Report for PCT/CN2015/079191 dated Feb. 24, 2016 6 Pages.

*Primary Examiner* — Truc M Do
(74) *Attorney, Agent, or Firm* — Anova Law Group, PLLC

(57) ABSTRACT

A method for controlling an unmanned aerial vehicle (UAV) includes receiving remote control information indicating an operating direction of a rudder stick of a remote controller. The remote control information includes a controller nose orientation of the remote controller and an operating angle of the rudder stick. The method further includes acquiring UAV attitude information of the UAV, determining a target flight direction in accordance with the remote control information and the UAV attitude information, and controlling the UAV to fly in the target flight direction. The target flight direction is the same as the operating direction of the rudder stick.

20 Claims, 11 Drawing Sheets

(56) References Cited

U.S. PATENT DOCUMENTS

| | | | | |
|---|---|---|---|---|
| 2010/0079729 | A1* | 4/2010 | Scanlon | G03B 21/00 353/13 |
| 2012/0212712 | A1* | 8/2012 | Scanlon | G09F 21/10 353/121 |
| 2012/0221179 | A1* | 8/2012 | Lee | G05D 1/0033 701/3 |
| 2015/0051755 | A1* | 2/2015 | Erhart | G05D 1/102 701/2 |
| 2015/0304869 | A1* | 10/2015 | Johnson | H04W 24/08 701/2 |
| 2017/0293298 | A1* | 10/2017 | Song | G01C 21/00 |
| 2017/0336804 | A1* | 11/2017 | Yang | B64C 39/024 |

FOREIGN PATENT DOCUMENTS

| | | |
|---|---|---|
| CN | 103345826 A | 10/2013 |
| CN | 103365298 A | 10/2013 |
| CN | 103453875 A | 12/2013 |
| CN | 103590606 A | 2/2014 |
| CN | 103956036 A | 7/2014 |
| CN | 104180796 A | 12/2014 |
| CN | 204050970 U | 12/2014 |
| CN | 205211142 U | 5/2016 |
| CN | 105717930 A | 6/2016 |
| EP | 0748470 A1 | 12/1996 |
| EP | 1448436 A1 | 8/2004 |
| EP | 2613213 A1 | 7/2013 |
| JP | H0519854 A | 1/1993 |
| JP | H09510032 A | 10/1997 |
| JP | H11115896 A | 4/1999 |
| JP | 2000024333 A | 1/2000 |
| JP | 2001209427 A | 8/2001 |
| JP | 2006282037 A | 10/2006 |
| JP | 2010134499 A | 6/2010 |
| JP | 2013033379 A | 2/2013 |
| JP | 2013144539 A | 7/2013 |
| WO | 9524004 A1 | 9/1995 |
| WO | 2014187205 A1 | 11/2014 |
| WO | 2015126447 A1 | 8/2015 |

* cited by examiner

CONTROL METHODS AND APPARATUSES BASED ON HEADLESS MODE FOR UNMANNED AERIAL VEHICLE

CROSS-REFERENCE TO RELATED APPLICATION

This is a continuation application of International Application No. PCT/CN2015/079191, filed on May 18, 2015, the entire contents of which are incorporated herein by reference.

TECHNICAL FIELD

The present disclosure relates to the technology field of unmanned aerial vehicle and, in particular, to a control method and apparatus based on headless mode for an unmanned aerial vehicle.

BACKGROUND

An aircraft without on-board pilot is also referred to as an unmanned aerial vehicle (UAV), which can be controlled by using a radio remote control apparatus and a self-contained control program device. It has extensive application prospects in fields of detection, search and rescue, and aerial photography. A conventional control mode of unmanned aerial vehicle is a pilot-oriented mode. The so-called pilot-oriented mode means that a pilot's viewing angle always coincides with a head viewing angle of the unmanned aerial vehicle. The flight direction is in accordance with the direction of the pilot's orientation. That is, when a rudder stick of a remote control apparatus is moved forward, the unmanned aerial vehicle flies towards the direction of the head of the unmanned aerial vehicle. When the rudder stick of the remote control apparatus is moved backward, the unmanned aerial vehicle flies towards the direction of the tail of the unmanned aerial vehicle. One of the situations included in the pilot-oriented mode is as follows: the tail of the unmanned aerial vehicle faces the user. In this situation, the flying action of the unmanned aerial vehicle is consistent with the operating direction of the rudder stick of the remote control apparatus. Another situation is that the head of the unmanned aerial vehicle faces the operator. In this situation, if the rudder stick of the remote control apparatus is moved forward, the unmanned aerial vehicle flies towards the direction of the head of the unmanned aerial vehicle. That is, it flies towards the direction of the user. It is obvious that, in the above two situations, when the operating directions of the rudder stick are the same, the flight directions of the unmanned aerial vehicle are different. Therefore, in order to control the unmanned aerial vehicle to fly in accordance with the pilot-oriented mode, the user needs to accurately judge the orientation of the head of the unmanned aerial vehicle at any time. However, it is quite difficult for a user who is new to the unmanned aerial vehicle to control in the pilot-oriented mode.

In order to solve the operation difficulty caused by the pilot-oriented mode, a headless mode of remote control for an unmanned aerial vehicle is proposed. In the headless mode of the unmanned aerial vehicle, when the unmanned aerial vehicle takes off, a take-off direction of the unmanned aerial vehicle is recorded. The take-off direction is used as a flight direction of the unmanned aerial vehicle. For example, when the take-off direction is directly in front of the remote control apparatus, a corresponding relationship between the flight direction of the unmanned aerial vehicle and the control direction on the remote control apparatus is as follows: when the rudder stick of the remote control apparatus is pushed forward, the unmanned aerial vehicle flies along the direction of the take-off direction. When the rudder stick is pushed backwards, the unmanned aerial vehicle flies along the opposite direction of the take-off direction. When the rudder stick is pushed right, the unmanned aerial vehicle flies right. And, when the rudder stick is pushed left, the unmanned aerial vehicle flies left.

When the unmanned aerial vehicle rotates 180 degrees clockwise, the corresponding relationship between the flight direction of the unmanned aerial vehicle and the control direction on the remote control apparatus is as follows: when the rudder stick of the remote control apparatus is pushed forward, the unmanned aerial vehicle flies along an opposite direction of the take-off direction. When the rudder stick is pushed backwards, the unmanned aerial vehicle flies along the direction of the take-off direction. When the rudder stick is pushed right, the unmanned aerial vehicle flies right. And, when the rudder stick is pushed left, the unmanned aerial vehicle flies left. Similarly, the problem of disordered flight directions and increased control difficulty may also occur in the headless mode of unmanned aerial vehicle.

SUMMARY OF THE DISCLOSURE

In accordance with the disclosure, there is provided a method for controlling an unmanned aerial vehicle (UAV) including receiving remote control information indicating an operating direction of a rudder stick of a remote controller. The remote control information includes a controller nose orientation of the remote controller and an operating angle of the rudder stick. The method further includes acquiring UAV attitude information of the UAV, determining a target flight direction in accordance with the remote control information and the UAV attitude information, and controlling the UAV to fly in the target flight direction. The target flight direction is the same as the operating direction of the rudder stick.

Also in accordance with the disclosure, there is provided a flight controller for controlling a UAV. The flight controller includes a receiver, an attitude sensor, and a smart controller. The receiver is configured to receive remote control information indicating an operating direction of a rudder stick of a remote controller. The remote control information includes a controller nose orientation of the remote controller and an operating angle of the rudder stick. The attitude sensor is configured to acquire UAV attitude information of the UAV. The smart controller is configured to determine a target flight direction of the UAV in accordance with the remote control information and the UAV attitude information, and control the UAV to fly in the target flight direction. The target flight direction is the same as the operating direction of the rudder stick.

Also in accordance with the disclosure, there is provided a method for controlling a UAV using a remote controller. The method includes obtaining an operating angle of a rudder stick of the remote controller, acquiring a nose orientation of the remote controller, generating remote control information in accordance with the operating angle of the rudder stick and the nose orientation, and sending the remote control information to the UAV. The remote control information indicates an operating direction of the rudder stick.

Also in accordance with the disclosure, there is provided a remote controller including a smart controller, an attitude sensor, and a transmitter. The smart controller is configured to obtain an operating angle of a rudder stick of the remote controller and generate remote control information in accordance with the operating angle of the rudder stick and a nose orientation of the remote controller. The remote control information indicates an operating direction of the rudder stick. The attitude sensor is configured to acquire the nose orientation. The transmitter is configured to send the remote control information to a UAV.

DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

Figure 1:
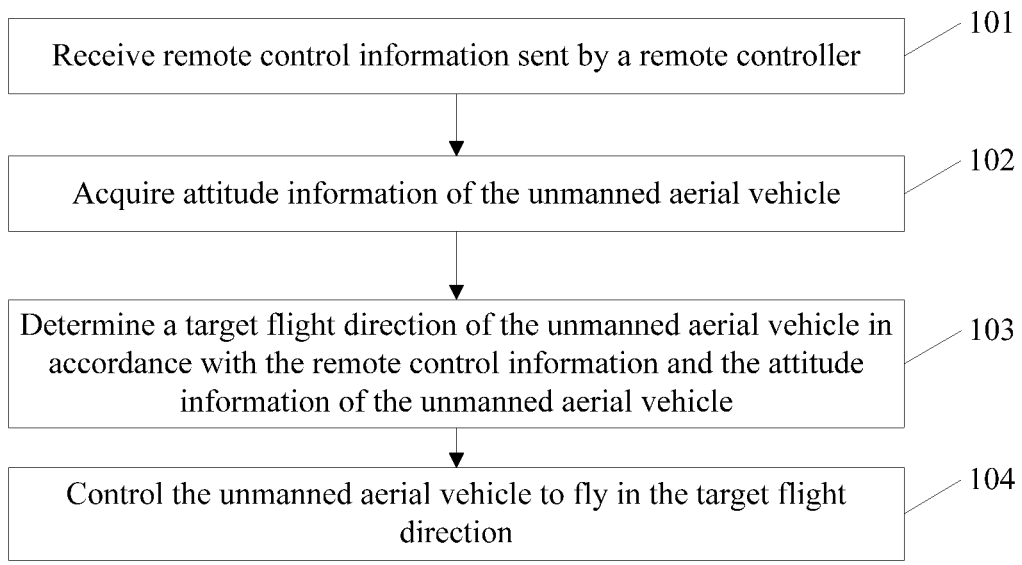
FIG. 1 is a schematic flow chart of a control method based on headless mode for an unmanned aerial vehicle in accordance with an embodiment of the present disclosure.

In some embodiments of the present disclosure, a control method based on headless mode for an unmanned aerial vehicle is provided to achieve smart control in a headless mode of the unmanned aerial vehicle. It may reduce operational difficulty of remote control and improve user experience. In some embodiments of the present disclosure, a flight controller, a processor, an unmanned aerial vehicle, and a remote controller are also provided accordingly to achieve smart control in a headless mode of the unmanned aerial vehicle.

In order to make the objectives, features, and advantages of the present disclosure clear and comprehensible, the technical solutions of the present disclosure are described below with reference to the accompanying drawings of the present disclosure. Apparently, the embodiments described below are merely some rather than all of the embodiments of the present disclosure. Based on the embodiments described here, all other embodiments obtained by persons of ordinary skill in the art without creative efforts all belong to the scope of the present disclosure.

The unmanned aerial vehicle in accordance with the embodiments of the present disclosure can be provided with a flight controller which includes various components, such as a positioning device, a receiver, a smart controller, an attitude sensor, and a recorder.

The positioning device is configured to acquire geographic position information of the unmanned aerial vehicle. In some embodiments, the positioning device may include, but not limited to, a Global Position System (GPS).

The receiver is configured to receive remote control information sent by a remote controller.

The smart controller is configured to process the remote control information and control the unmanned aerial vehicle to fly in accordance with the processing result.

The attitude sensor is configured to obtain attitude information of the unmanned aerial vehicle while the unmanned aerial vehicle is static or moving. The attitude information of the unmanned aerial vehicle, also referred to as "UAV attitude information," may include a yaw angle (i.e., a nose orientation), a pitch angle, and a roll angle of the unmanned aerial vehicle. Hereinafter, the nose orientation of the unmanned aerial vehicle is also referred to as a UAV nose orientation.

The attitude sensor of the flight controller can include, for example, a compass and/or an Inertial Measurement Unit (IMU). The compass is configured to obtain flight direction information of the unmanned aerial vehicle and the IMU is configured to obtain both flight direction information and attitude information of the unmanned aerial vehicle. Therefore, in some embodiments of the present disclosure, the flight direction of the unmanned aerial vehicle may be obtained accurately from a combination of data information obtained by the compass and the IMU. In some embodiments, the flight direction of the unmanned aerial vehicle can be obtained from a combination of geographic position information of the unmanned aerial vehicle acquired by the GPS and the flight direction information and the attitude information of the unmanned aerial vehicle acquired by the IMU.

The recorder is configured to record geographic position information of a return point, a real-time flight direction of the unmanned aerial vehicle, and so on.

The remote controller can be provided with a processor which includes various components, such as a smart controller, a transmitter, a positioning device, and an attitude sensor.

The smart controller is configured to monitor a user's operation and obtain related remote control information.

The transmitter is configured to send the remote control information to the unmanned aerial vehicle.

The positioning device is configured to acquire geographic position information of the remote controller. The position device can be, for example, a GPS.

The attitude sensor is configured to obtain attitude information of the remote controller, also referred to as "controller attitude information," while the remote controller is static or moving. The attitude information of the remote controller may include a nose orientation, a pitch angle, and a roll angle of the remote controller. Hereinafter, the nose orientation of the remote controller is also referred to as a "controller nose orientation."

The attitude sensor of the processor can include, for example, a compass and/or an IMU. The compass is configured to obtain direction information of the remote controller and the IMU is configured to obtain attitude information of the remote controller. Therefore, in some embodiments of the present disclosure, the nose orientation of the remote controller may be obtained from a combination of data information obtained by the compass and the IMU. In some embodiments, the nose orientation of the remote controller may also be obtained from a combination of the geographic position information of the remote controller acquired by the GPS and the attitude information of the remote controller acquired by the IMU.

It should be noted that the present disclosure may achieve corresponding functions based on a lock mechanism of the remote controller for a headless mode of the unmanned aerial vehicle. Therefore, the remote controller may be equipped with a remote-locked mode button through which the functions corresponding to the remote-controller-locked mechanism may be enabled. The remote-controller-locked mechanism may be as follows: in the headless mode of the unmanned aerial vehicle, there is no need to decide the nose orientation of the unmanned aerial vehicle or to record a flight direction of the unmanned aerial vehicle during take-off. The unmanned aerial vehicle only needs to be controlled to fly towards an operating direction of a rudder stick by operating the rudder stick of the remote controller. As such, the flight direction of the unmanned aerial vehicle may be controlled to be the same as the operating direction of the rudder stick. Accordingly, smart control over the unmanned aerial vehicle can be achieved and operational difficulty of remote control for the unmanned aerial vehicle can be reduced.

In the headless mode of the remote controller, in addition to the above described remote-controller-locked mode, a head-locked mode (head-locked mechanism) and a return-point-locked mode (return-point-locked mechanism) may also be set through corresponding buttons respectively to achieve multi-selection of smart control over the unmanned aerial vehicle.

In some embodiments, a headless mode button and a conventional head mode button for controlling the unmanned aerial vehicle may both be provided on the remote controller. The head mode of unmanned aerial vehicle may refer to the so-called pilot-oriented mode. Accordingly, a user can select the headless mode or the pilot-oriented mode. In addition, in the headless mode, the user can further select any one of the above-described head-locked mode, return-point-locked mode, and remote-controller-locked mode.

It should also be noted that, corresponding programs for the headless mode and/or the pilot-oriented mode, and corresponding programs for the head-locked mode, the return-point-locked mode, and the remote-controller-locked mode may also be provided in the unmanned aerial vehicle in order for the unmanned aerial vehicle to cooperate with the remote controller to accomplish corresponding remote control functions.

Based on the above introduction, embodiments of the present disclosure are described below.

FIG. 1 is a schematic flow chart of a control method based on headless mode for an unmanned aerial vehicle in accordance with an embodiment of the present disclosure. The method shown in FIG. 1 can be implemented, for example, in a flight controller of the unmanned aerial vehicle.

As shown in FIG. 1, at 101, remote control information sent by a remote controller is received. The remote control information may include a controller nose orientation in attitude information of the remote controller. The remote control information may further include an operating angle of a rudder stick of the remote controller. The remote control information may be used for indicating an operating direction of the rudder stick of the remote controller.

In some embodiments, when the user selects a headless mode and starts the remote-controller-locked mechanism, the remote control information may be generated by a processor of the remote controller in accordance with an angle at which a user operates a rudder stick and the attitude information of the remote controller.

At 102, attitude information of the unmanned aerial vehicle is acquired.

At 103, a target flight direction of the unmanned aerial vehicle is determined in accordance with the remote control information and the attitude information of the unmanned aerial vehicle. The target flight direction can be the same as the operating direction of the rudder stick.

At 104, the unmanned aerial vehicle is controlled to fly in the target flight direction.

Consistent with embodiments of the present disclosure, the processor of the remote controller may provide related remote control information, including the controller nose orientation in the attitude information of the remote controller, and the operating angle of the rudder stick of the remote controller. Then, the flight controller of the unmanned aerial vehicle may perform analysis and processing according to the remote control information and the attitude information of the unmanned aerial vehicle to obtain the target flight direction.

As described above, the flight controller may receive remote control information from a remote controller. The remote control information may be used for indicating an operating direction of a rudder stick of the remote controller. Further, a target flight direction of the unmanned aerial vehicle may be determined in accordance with the remote control information and attitude information of the unmanned aerial vehicle. The target flight direction may be the same as the operating direction of the rudder stick of the remote controller. Then, the unmanned aerial vehicle may be controlled to fly in the target flight direction. Accordingly, the control method achieves a smart remote control based on headless mode because the flight direction of the unmanned aerial vehicle is the same as the operating direction of the rudder stick. It may simplify remote control operations, reduce operational difficulty of remote control over the unmanned aerial vehicle, and improve user experience.

Figure 2:
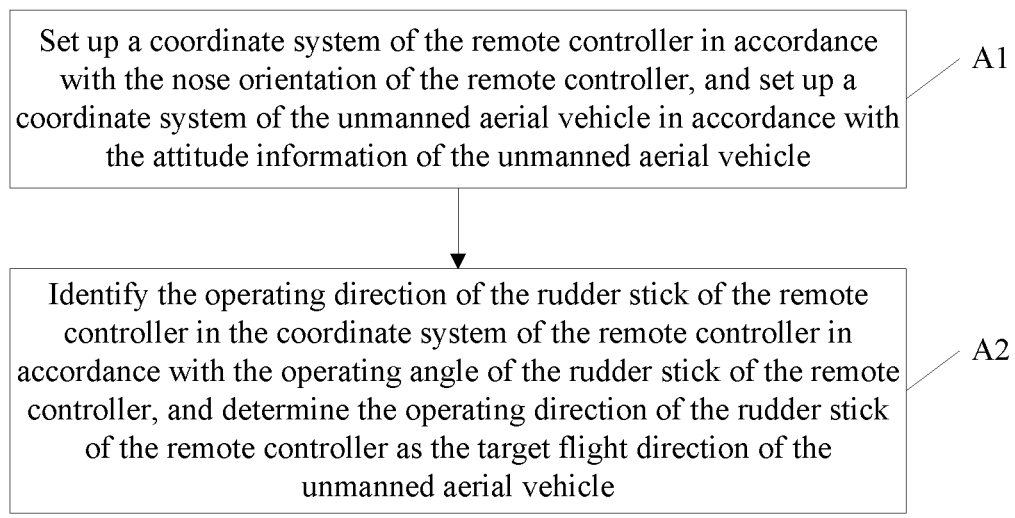
FIG. 2 is a schematic flow chart of a control method based on headless mode for an unmanned aerial vehicle in accordance with another embodiment of the present disclosure.

FIG. 2 shows an example of determining the target flight direction of the unmanned aerial vehicle (103 in FIG. 1). As shown in FIG. 2, at A1, a coordinate system of the remote controller, also referred to as a controller coordinate system, is set up in accordance with the controller nose orientation in the attitude information of the remote controller, and a coordinate system of the unmanned aerial vehicle, also referred to as a UAV coordinate system, is set up in accordance with the attitude information of the unmanned aerial vehicle. The origin of a geographic coordinate system is used as the origin of each of the controller and UAV coordinate systems.

At A2, the operating direction of the rudder stick of the remote controller is identified in the coordinate system of the remote controller in accordance with the operating angle of the rudder stick of the remote controller, and the operating direction of the rudder stick of the remote controller is determined as the target flight direction of the unmanned aerial vehicle.

Figure 3A:
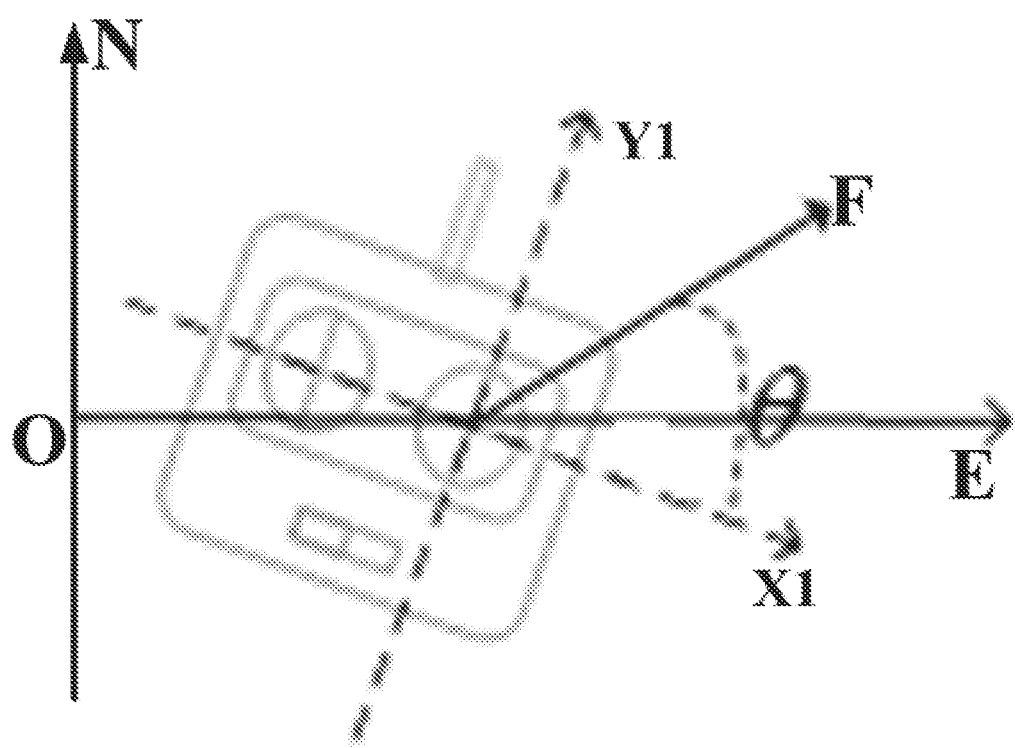
FIG. 3a is a schematic view of an operating direction of a rudder stick identified in a coordinate system of a remote controller in accordance with an embodiment of the present disclosure.

FIG. 3a is a schematic view showing an operating direction of the rudder stick identified in the coordinate system of the remote controller. The geographic coordinate system NEO is established on a plane. The coordinate system of the remote controller Y1X1O is set up in accordance with the controller nose orientation in the attitude information of the remote controller. The origin of the coordinate system of the remote controller Y1X1O coincides with the origin O of the geographic coordinate system NEO. The nose orientation of the remote controller may correspond to the upper half axis of the vertical axis (i.e., positive Y1-axis) while the tail of the remote controller may correspond to the lower half axis of the vertical axis (i.e., negative Y1-axis). The operating angle of the rudder stick of the remote controller, i.e., the angle θ in FIG. 3a, may be obtained counterclockwise from the positive half axis of the horizontal axis of the coordinate system of the remote controller Y1X1O. The direction F, forming the angle θ with the positive half axis of the horizontal axis of the coordinate system of the remote controller Y1X1O, is the operating direction of the rudder stick of the remote controller.

The angle θ may be obtained from a channel value corresponding to the operation of the rudder stick of the remote controller. It may be the value of a trigonometric function of the channel value.

Figure 3B:
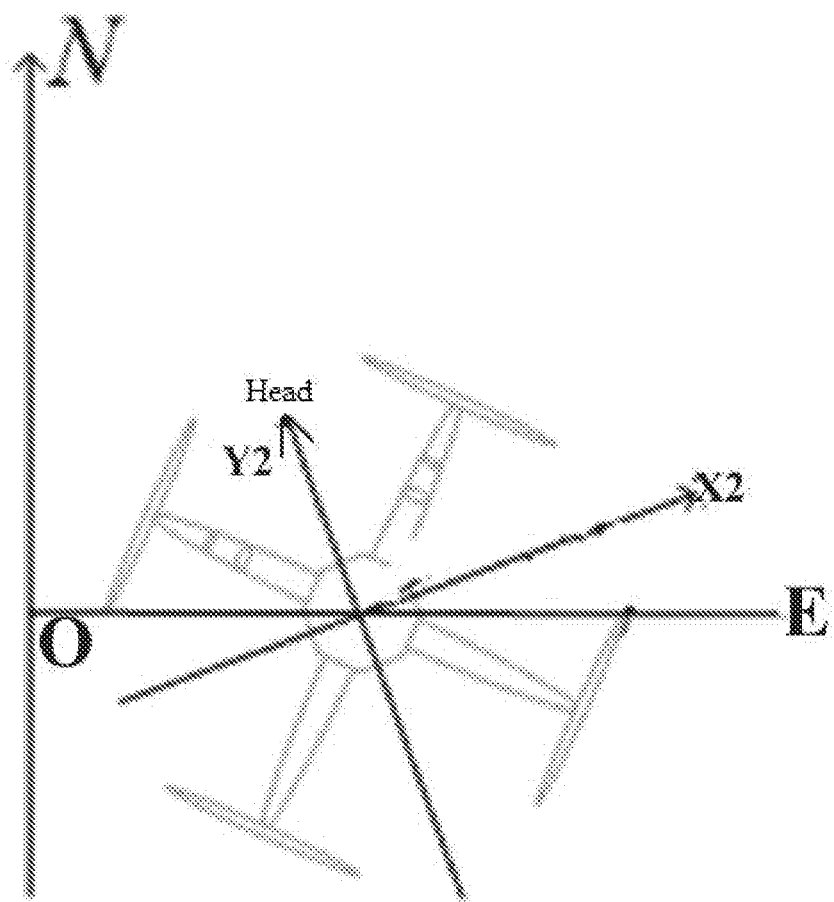
FIG. 3b is a schematic view of a coordinate system of an unmanned aerial vehicle in accordance with an embodiment of the present disclosure.

FIG. 3b is a schematic view showing a coordinate system of the unmanned aerial vehicle. In FIG. 3b, the geographic coordinate system NEO is established on a plane. The coordinate system of the unmanned aerial vehicle Y2X2O is set up in accordance with the attitude information of the unmanned aerial vehicle. The origin of the coordinate system of the unmanned aerial vehicle Y2X2O coincides with the origin O of the geographic coordinate system. The nose orientation of the unmanned aerial vehicle may correspond to the upper half axis of the vertical axis of the coordinate system of the unmanned aerial vehicle Y2X2O.

Figure 3C:
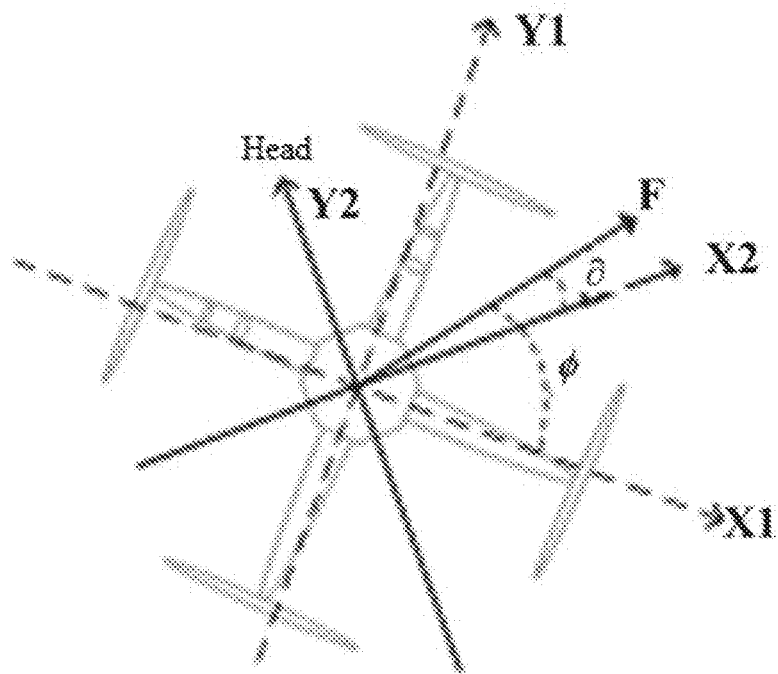
FIG. 3c is a schematic view of a target flight direction of an unmanned aerial vehicle identified in the coordinate system of the unmanned aerial vehicle in accordance with an embodiment of the present disclosure.

FIG. 3c is a schematic view of the target flight direction of the unmanned aerial vehicle identified in the coordinate system of the unmanned aerial vehicle in accordance with an embodiment of the present disclosure. Based on the setup shown in FIGS. 3a and 3b, FIG. 3c sets up the coordinate system of the remote controller and the coordinate system of the unmanned aerial vehicle in accordance with the controller nose orientation in the attitude information of the remote controller, and the attitude information of the unmanned aerial vehicle, respectively. The origins of the coordinate system of the remote controller and the coordinate system of the unmanned aerial vehicle coincide with the origin of the geographic coordinate system NEO. That is, FIG. 3c is obtained by combining FIG. 3a and FIG. 3b. Angle φ in FIG. 3c equals the angle θ in FIG. 3a. The direction F is the target flight direction of the unmanned aerial vehicle. An angle ∂ between the direction F and the horizontal axis of the coordinate system of the unmanned aerial vehicle may be a target flight angle of the unmanned aerial vehicle.

It should be noted that, when the coordinate systems shown in FIG. 3c is established, the coordinate systems are established on the same horizontal plane. However, in some embodiments, the remote controller may also be in a different attitude, and thus a pitch angle and a roll angle in the attitude information of the remote controller may need to be considered, to identify the direction F more and calculate the angle ∂ between the direction F and the horizontal axis of the coordinate system of the unmanned aerial vehicle. In FIGS. 3a-3c, descriptions are given as an example by assuming that the unmanned aerial vehicle is currently flying horizontally and that the remote controller is also in a horizontal plane.

Figure 3D:
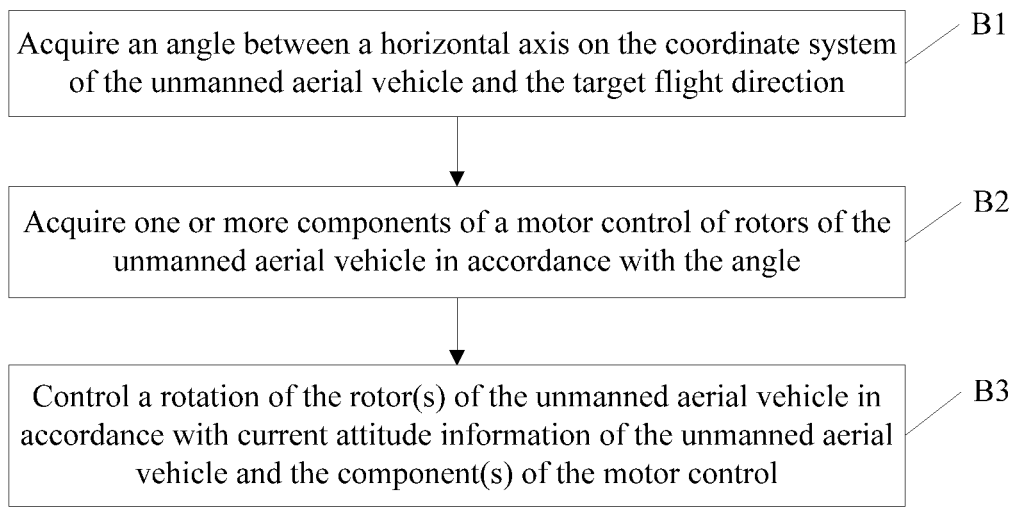
FIG. 3d is a schematic flow chart of a control method based on headless mode for an unmanned aerial vehicle in accordance with another embodiment of the present disclosure.

FIG. 3d shows an example of controlling the unmanned aerial vehicle to fly in the target flight direction (104 in FIG. 1). As shown in FIG. 3d, at B1, an angle between a horizontal axis on the coordinate system of the unmanned aerial vehicle and the target flight direction is acquired.

At B2, one or more components of a motor control, also referred to as motor control components, of rotors of the unmanned aerial vehicle are acquired in accordance with the angle.

At B3, a rotation of the rotor(s) of the unmanned aerial vehicle is controlled in accordance with current attitude information of the unmanned aerial vehicle and the component(s) of the motor control. As such, the unmanned aerial vehicle may be controlled to fly in the target flight direction.

A motor control component of a rotor is obtained in accordance with the angle ∂ between the direction F and the horizontal axis of the coordinate system of the unmanned aerial vehicle as shown in FIG. 3c and in combination with the attitude of the unmanned aerial vehicle. The rotation of the rotors is controlled in accordance with the motor control components of the rotors to control the unmanned aerial vehicle to fly in the direction F.

Consistent with embodiments of the present disclosure, the unmanned aerial vehicle may obtain a target flight direction in accordance with attitude information of a remote controller, an operating angle of a rudder stick of the remote controller, and current attitude information of the unmanned aerial vehicle. The target flight direction may be the same as the operating direction of the rudder stick of the remote controller. Accordingly, the unmanned aerial vehicle may be controlled to fly in the target flight direction.

It should be noted that, as the embodiments of the present disclosure achieve the functions corresponding to the remote-controller-locked mechanism, remote control information sent by the remote controller may carry indication information of headless mode and indication information of the remote-controller-locked mechanism. The unmanned aerial vehicle may start the controller-locked mode in the headless mode accordingly.

Figure 3E:
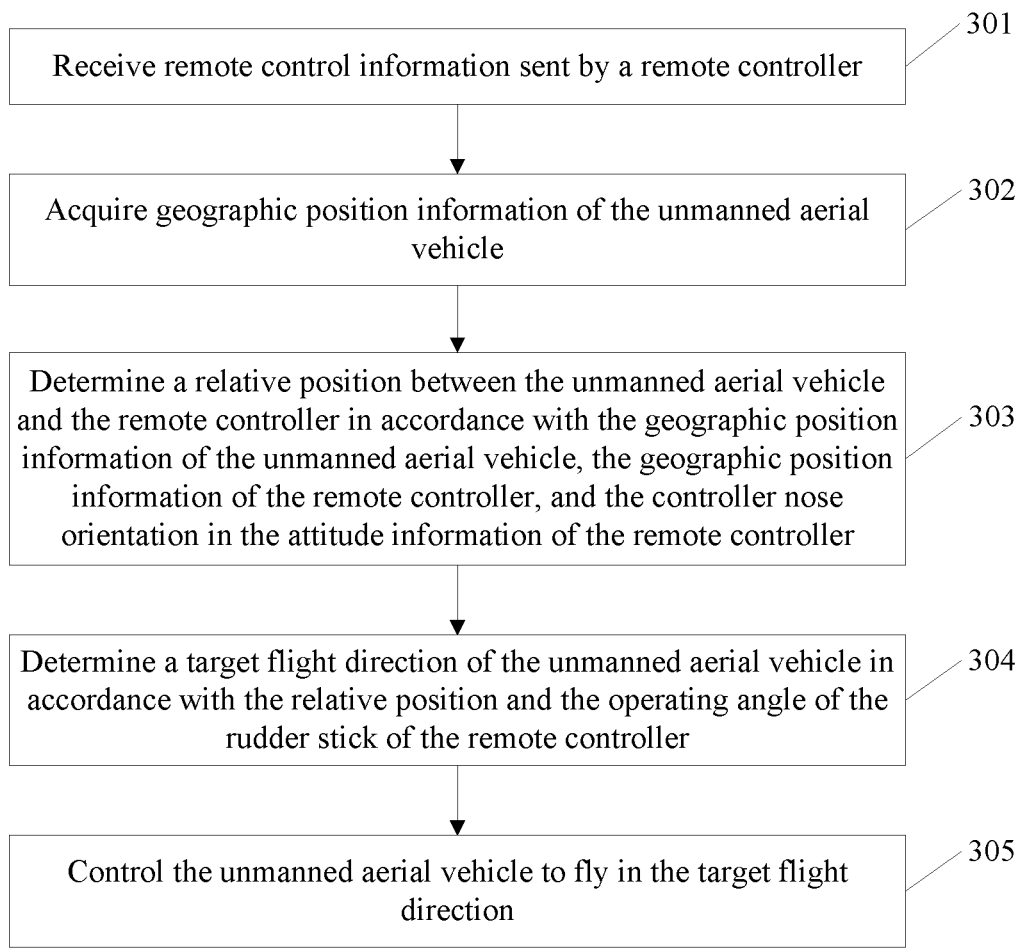
FIG. 3e is a schematic flow chart of a control method based on headless mode for an unmanned aerial vehicle in accordance with another embodiment of the present disclosure.

FIG. 3e, shows a flow chart of a control method based on headless mode for an unmanned aerial vehicle according to another embodiment of the disclosure. The method shown in FIG. 3e may be implemented in a flight controller of the unmanned aerial vehicle.

As shown in FIG. 3e, at 301, remote control information sent by a remote controller is received.

The remote control information may include a controller nose orientation in attitude information of the remote controller, an operating angle of a rudder stick of the remote controller, and geographic position information of the remote controller.

At 302, geographic position information of the unmanned aerial vehicle is acquired.

The geographic position information of the unmanned aerial vehicle may be acquired through a positioning device of the flight controller.

At 303, a relative position between the unmanned aerial vehicle and the remote controller is determined in accordance with the geographic position information of the unmanned aerial vehicle, the geographic position information of the remote controller, and the controller nose orientation in the attitude information of the remote controller.

A physical location and the nose orientation of the remote controller can be determined in accordance with the geographic position information of the remote controller and the controller nose orientation in the attitude information of the remote controller. The relative position between the unmanned aerial vehicle and the remote controller can be determined in accordance with the geographic position information of the unmanned aerial vehicle. The relative position may refer to that the unmanned aerial vehicle is in front of the head of the remote controller or behind the head of the remote controller.

At 304, a target flight direction of the unmanned aerial vehicle is determined in accordance with the relative position and the operating angle of the rudder stick of the remote controller.

In some embodiments, the operating angle of the rudder stick of the remote controller is 90 degrees or 270 degrees. Only two channels of the remote controller are used. That is, the operating direction of the rudder stick is the direction of the nose orientation of the remote controller or the opposite direction of the nose orientation of the remote controller.

The target flight direction of the unmanned aerial vehicle may be different depending on whether the unmanned aerial vehicle is in front of or behind the head of the remote controller determined above at 303, as described in detail below.

If the unmanned aerial vehicle is in front of the head of the remote controller and the operating direction of the rudder stick is the direction of the nose orientation of the remote controller, the target flight direction of the unmanned aerial vehicle may be determined as pointing away from the remote controller. The unmanned aerial vehicle may fly in a direction indicated by the operating direction of the rudder stick, to fly away from the remote controller.

If the unmanned aerial vehicle is in front of the head of the remote controller and the operating direction of the rudder stick is the opposite direction of the nose orientation of the remote controller, the target flight direction of the unmanned aerial vehicle may be determined as pointing towards the remote controller. The unmanned aerial vehicle may fly in a direction indicated by the operating direction of the rudder stick, to fly towards the remote controller.

If the unmanned aerial vehicle is behind the head of the remote controller and the operating direction of the rudder stick is the direction of the nose orientation of the remote controller, the target flight direction of the unmanned aerial vehicle may be determined as pointing towards the remote controller. The unmanned aerial vehicle may fly in a direction indicated by the operating direction of the rudder stick, to fly towards the remote controller.

If the unmanned aerial vehicle is behind the head of the remote controller and the operating direction of the rudder stick is the opposite direction of the nose orientation of the remote controller, the target flight direction of the unmanned aerial vehicle may be determined as pointing away from the remote controller. The unmanned aerial vehicle may fly in a direction indicated by the operating direction of the rudder stick, to fly away from the remote controller.

At 305, the unmanned aerial vehicle is controlled to fly in the target flight direction.

Consistent with embodiments of the present disclosure, the remote control information sent by the remote controller may further include geographic position information of the remote controller. Therefore, the target flight direction of the unmanned aerial vehicle may be determined according to a combination of the geographic position information of the remote controller and the controller nose orientation in the attitude information of the remote controller. As such, the geographic position of the unmanned aerial vehicle can be more effectively controlled and the unmanned aerial vehicle may not be lost.

The embodiments described above with reference to FIG. 1 to FIG. 3d may include implementation of two functions. The two functions may be selected by different selection switches on the remote controller or by starting different application programs. A user may select either one of the two as needed.

Figure 3F:
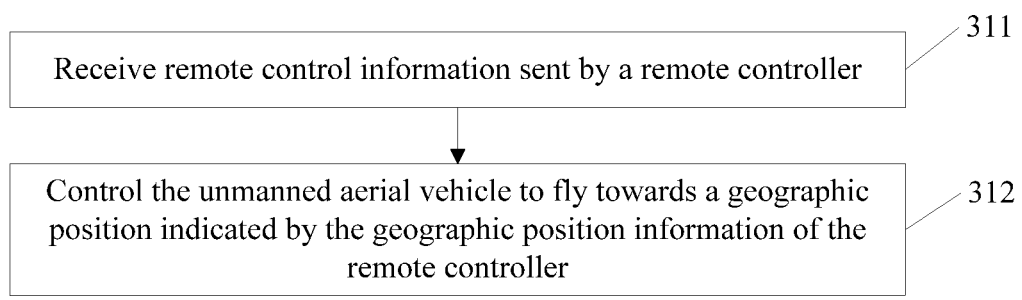
FIG. 3f is a schematic flow chart of a control method based on headless mode for an unmanned aerial vehicle in accordance with another embodiment of the present disclosure.

According to embodiments of the present disclosure, a return point can be dynamically set and the unmanned aerial vehicle can be controlled to return to the return point. FIG. 3f shows a flow chart of a control method based on headless mode for an unmanned aerial vehicle according to another embodiment of the disclosure. The method can be implemented, for example, in a flight controller of the unmanned aerial vehicle.

At 311, remote control information sent by a remote controller is received. The remote control information may include return indication information which may include geographic position information of the remote controller.

When the unmanned aerial vehicle is required to return, a return-point locked mode can be triggered by pressing a corresponding button on the remote controller or turning of the remote controller. Remote control information can be sent to the unmanned aerial vehicle. The remote control information can include return instruction information, which may include at least geographic position information of the remote controller.

At 312, the unmanned aerial vehicle is controlled to fly towards a geographic position indicated by the geographic position information of the remote controller.

Consistent with embodiments of the present disclosure, the geographic position of the remote controller may be used as a return point to achieve dynamic setting of the return point. It may be used to achieve the final return of the unmanned aerial vehicle.

Figure 4A:
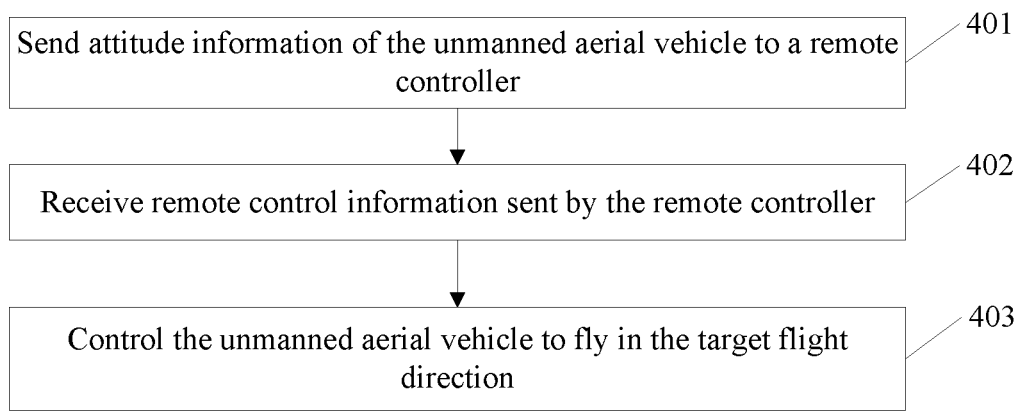
FIG. 4a is a schematic flow chart of a control method based on headless mode for an unmanned aerial vehicle in accordance with another embodiment of the present disclosure.

FIG. 4a is a schematic flow chart of a control method based on headless mode for an unmanned aerial vehicle in accordance with another embodiment of the present disclosure. The method can be implemented in a flight controller of the unmanned aerial vehicle side.

At 401, attitude information of the unmanned aerial vehicle is sent to a remote controller.

At 402, remote control information sent by the remote controller is received. The remote control information may include a target flight direction of the unmanned aerial vehicle. The remote control information may be acquired by the remote controller in accordance with the attitude information of the unmanned aerial vehicle, a controller nose orientation in attitude information of the remote controller, and an operating angle of a rudder stick of the remote controller.

At 403, the unmanned aerial vehicle is controlled to fly in the target flight direction.

Consistent with embodiments of the present disclosure, a flight controller of an unmanned aerial vehicle may send attitude information of the unmanned aerial vehicle to a remote controller. A processor of the remote controller may obtain a target flight direction of the unmanned aerial vehicle in accordance with the attitude information of the unmanned aerial vehicle, a controller nose orientation in attitude information of the remote controller, and an operating angle of a rudder stick of the remote controller. The processor may directly send the target flight direction to the flight controller. Accordingly, the flight controller may control the unmanned aerial vehicle to fly in the target flight direction. That is, consistent with embodiments of the present disclosure, the processor of the remote controller may acquire the target flight direction of the unmanned aerial vehicle.

Figure 4B:
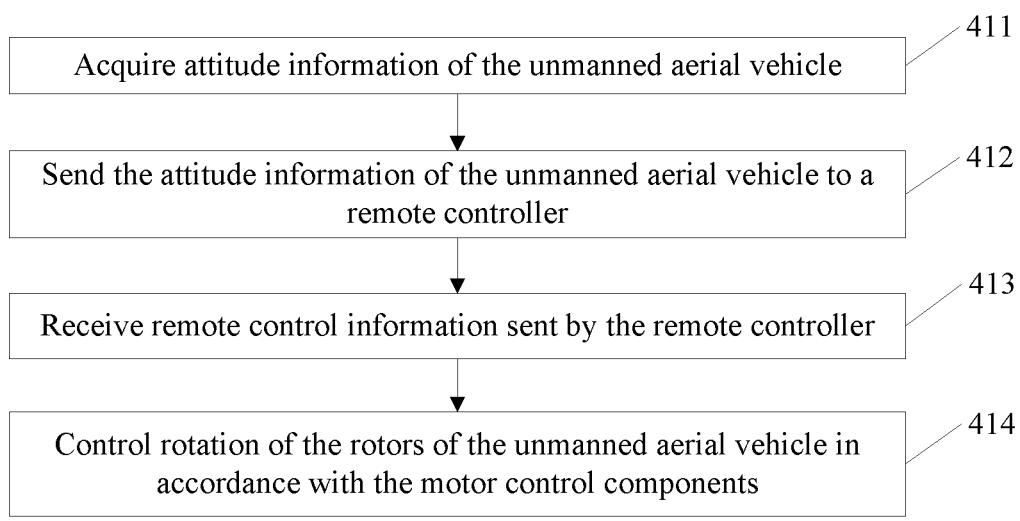
FIG. 4b is a schematic flow chart of a control method based on headless mode for an unmanned aerial vehicle in accordance with another embodiment of the present disclosure.

FIG. 4b shows a flow chart of a control method based on headless mode for an unmanned aerial vehicle according to another embodiment of the disclosure.

As shown in FIG. 4b, at 411, attitude information of the unmanned aerial vehicle is acquired.

At 412, the attitude information of the unmanned aerial vehicle is sent to a remote controller.

At 413, remote control information sent by the remote controller is received. The remote control information may include a target flight direction of the unmanned aerial vehicle and one or more motor control components of rotors of the unmanned aerial vehicle.

The remote control information may be acquired by the remote controller in accordance with the attitude information of the unmanned aerial vehicle, a controller nose orientation in attitude information of the remote controller, and an operating angle of a rudder stick of the remote controller.

The method of acquiring the target flight direction of the unmanned aerial vehicle and the motor control components of the rotors of the unmanned aerial vehicle by the processor of the remote controller side may be similar to the acquisition method by the flight controller of the unmanned aerial vehicle. Reference can be made to FIG. 3a to FIG. 3d for details, and the acquisition method is not repeated herein.

At 414, rotation of the rotors of the unmanned aerial vehicle is controlled in accordance with the motor control components. The unmanned aerial vehicle may be controlled to fly in the target flight direction.

Consistent with embodiments of the present disclosure, a flight controller of an unmanned aerial vehicle may send acquired attitude information of the unmanned aerial vehicle to a processor of a remote controller. The processor may calculate a target flight direction of the unmanned aerial vehicle and one or more motor control components of rotors of the unmanned aerial vehicle in accordance with the attitude information of the unmanned aerial vehicle, attitude information of the remote controller, and an operating angle of a rudder stick of the remote controller. The processor of the remote controller may then include the target flight direction and the motor control components of the rotors of the unmanned aerial vehicle in remote control information and sent the remote control information to the flight controller. The flight controller may control rotation of the rotors of the unmanned aerial vehicle through the motor control components, to control the unmanned aerial vehicle to fly in the target flight direction.

In addition, the positioning device of the flight controller may acquire geographic position information of the unmanned aerial vehicle. The geographic position information of the unmanned aerial vehicle may be sent to the remote controller, so that the remote controller may determine the target flight direction of the unmanned aerial vehicle in accordance with the geographic position information of the unmanned aerial vehicle, geographic position information of the remote controller, and a nose orientation in attitude information of the unmanned aerial vehicle. A specific determination method will be described in detail in the following embodiments related to the remote controller, which is not repeated herein.

In addition, consistent with embodiments of the present disclosure, a return point may be dynamically set and the unmanned aerial vehicle may be controlled to return to the return point. Therefore, the unmanned aerial vehicle may also receive return indication information sent by the remote controller. The return indication information may include geographic position information of the remote controller. The unmanned aerial vehicle may be controlled to fly towards a geographic position indicated by the geographic position information of the remote controller. Reference can be made to the embodiments described above in connection with FIG. 3, and the description of the method is not repeated herein.

Figure 5A:
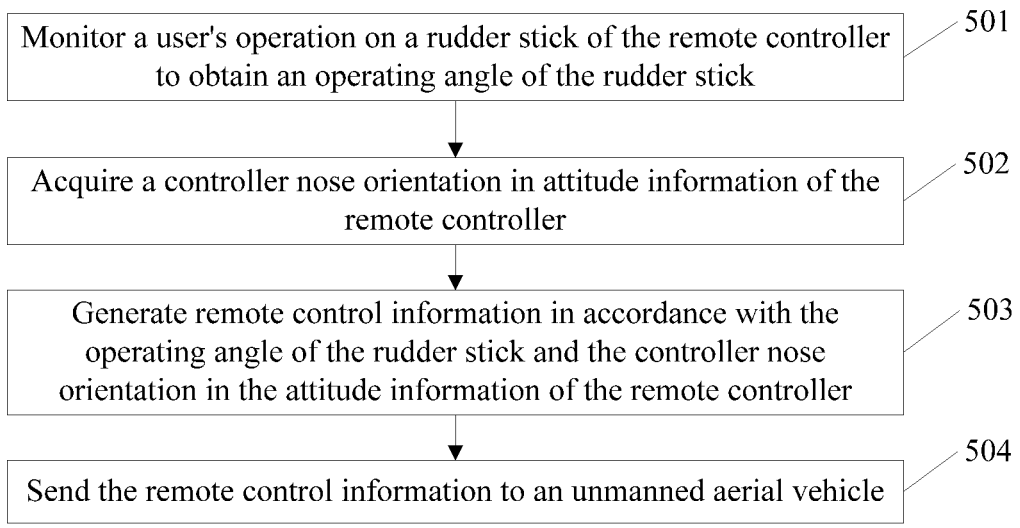
FIG. 5a is a schematic flow chart of a control method based on headless mode for an unmanned aerial vehicle in accordance with another embodiment of the present disclosure.

FIG. 5a is a schematic flow chart of a control method based on headless mode for an unmanned aerial vehicle in accordance with another embodiment of the present disclosure. The method can be implemented in a processor of a remote controller.

As shown in FIG. 5a, at 501, a user's operation on a rudder stick of the remote controller is monitored to obtain an operating angle of the rudder stick.

The processor of the remote controller may monitor the user's operation on the remote controller in real time, including an operation on the rudder stick of the remote controller, an operation of starting a button on the remote controller, and so on.

At 502, a controller nose orientation in attitude information of the remote controller is acquired.

The processor may further acquire nose orientation of the remote controller in the attitude information of the remote controller.

At 503, remote control information is generated in accordance with the operating angle of the rudder stick and the controller nose orientation in the attitude information of the remote controller. The remote control information may be used for indicating an operating direction of the rudder stick of the remote controller.

At 504, the remote control information is sent to an unmanned aerial vehicle.

Consistent with embodiments of the present disclosure, a target flight direction of the unmanned vehicle can be acquired by a flight controller of the unmanned aerial vehicle (a specific acquisition method is described in detail with reference to FIG. 3a to FIG. 3d, and is not repeated herein). Therefore, the processor of the remote controller may send the attitude information of the remote controller and the operating angle of the rudder stick to the flight controller.

Consistent with embodiments of the present disclosure, a control apparatus of a remote controller for controlling an unmanned aerial vehicle (also referred to as a UAV control apparatus of the remote controller) may obtain an operating angle of a rudder stick by monitoring a user's operation on the rudder stick. The UAV control apparatus of the remote controller may also acquire a controller nose orientation in attitude information of the remote controller, and generate remote control information in accordance with the operating angle of the rudder stick and the controller nose orientation in the attitude information of the remote controller. The remote control information may indicate an operating direction of the rudder stick of the remote controller and may be sent to the unmanned aerial vehicle. A control apparatus of an unmanned aerial vehicle for controlling the unmanned aerial vehicle (also referred to as a "UAV control apparatus of the unmanned aerial vehicle) may obtain a target flight direction of the unmanned aerial vehicle in accordance with the remote control information. The target flight direction may be the same as the operating direction of the rudder stick of the remote controller. Smart control in a headless mode is achieved by making the flight direction of the unmanned aerial vehicle to be the same as the operating direction of the rudder stick. Accordingly, remote control operations may be simplified. Operational difficulty of remote control over the unmanned aerial vehicle may be reduced. Further, user experience may be improved.

In some embodiments, generating the remote control information in accordance with the operating angle of the rudder stick and the controller nose orientation in the attitude information of the remote controller may include monitoring the user's operation on the rudder stick of the remote controller to acquire a channel value corresponding to the rudder stick of the remote controller, obtaining the operating angle of the rudder stick of the remote controller in accordance with the channel value, and generating the remote control information in accordance with the operating angle of the rudder stick of the remote controller and the controller nose orientation in the attitude information of the remote controller.

In some embodiments, the remote controller may include 8 channels. Each channel may correspond to one channel value, and the channel values of different channels may be different. The operation on the rudder stick of the remote controller is to shift the rudder stick onto the corresponding channel. The UAV control apparatus of the remote controller may acquire the channel value. A trigonometric function of the channel value may be solved to obtain the angle θ in FIG. 3a, i.e., the operating angle of the rudder stick of the remote controller.

Figure 5B:
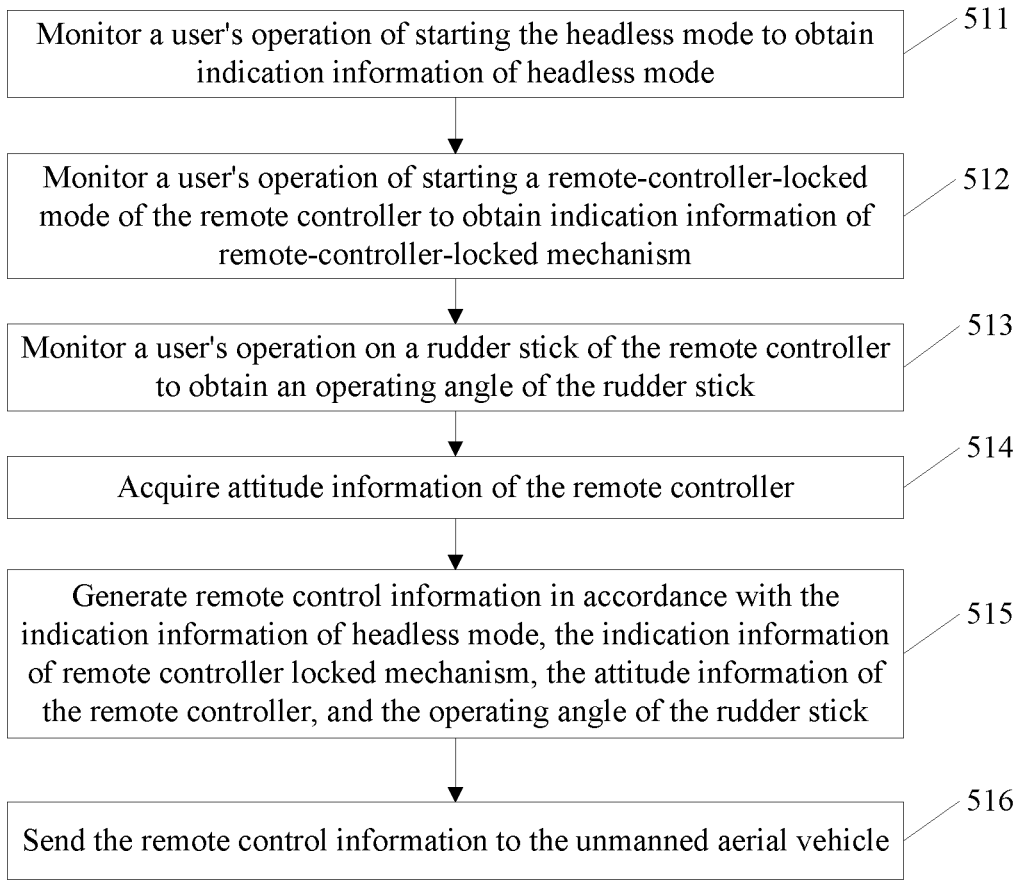
FIG. 5b is a schematic flow chart of a control method based on headless mode for an unmanned aerial vehicle in accordance with another embodiment of the present disclosure.

FIG. 5b is a schematic flow chart of a control method based on headless mode for an unmanned aerial vehicle in accordance with another embodiment of the present disclosure. As shown in FIG. 5b, at 511, a user's operation of starting the headless mode is monitored to obtain indication information of headless mode, also referred to as "headless mode indication information."

At 512, a user's operation of starting a remote-controller-locked mode of the remote controller is monitored to obtain indication information of remote-controller-locked mechanism, also referred to as "controller locking indication information."

At 513, a user's operation on a rudder stick of the remote controller is monitored to obtain an operating angle of the rudder stick.

At 514, attitude information of the remote controller is acquired.

At 515, remote control information is generated in accordance with the indication information of headless mode, the indication information of remote controller locked mechanism, the attitude information of the remote controller, and the operating angle of the rudder stick.

At 516, the remote control information is sent to the unmanned aerial vehicle.

In some embodiments, when the target flight direction of the unmanned aerial vehicle is calculated, all contents in the attitude information of the remote controller may be taken into account. For example, the nose orientation, a pitch angle, and a roll angle of the remote controller may be all taken into account in the calculation.

Consistent with embodiments of the present disclosure, a remote controller may detect a user's operation on the remote controller, such as a starting operation of a headless mode, starting of a remote-controller-locked mode, and an operation on a rudder stick, to obtain indication information of headless mode, indication information of remote-controller-locked mechanism, attitude information of the remote controller, and an operating angle of the rudder stick of the remote controller. These information contents may be carried in remote control information sent to the unmanned aerial vehicle. The unmanned aerial vehicle may start a corresponding program in accordance with the remote control information and may obtain a target flight direction in accordance with geographic position information and the operating angle of the rudder stick of the remote controller. The unmanned aerial vehicle may be controlled to fly in the target flight direction accordingly.

The remote controller may acquire geographic position information of the remote controller through a positioning device. The geographic position information of the remote controller may be carried in the remote control information to be sent to the unmanned aerial vehicle. It may enable the unmanned aerial vehicle to determine the target flight direction of the unmanned aerial vehicle according to a combination of the geographic position information of the remote controller and a controller nose orientation in attitude information of the remote controller. A specific determination method has been described in detail with reference to FIG. 3e, which is not repeated herein.

In some embodiments, a return point may be dynamically set and the unmanned aerial vehicle may be controlled to return to the return point. When the unmanned aerial vehicle needs to return, a return-point lock mode may be triggered by starting a corresponding button on the remote controller, or by turning off the remote controller. The remote controller may send remote control information to the unmanned aerial vehicle. The remote control information may include return instruction information. The return instruction information may at least include geographic position information of the remote controller. Therefore, consistent with embodiments of the present disclosure, the geographic position of the remote controller can be used as a return point, to achieve dynamic setting of the return point.

Figure 6:
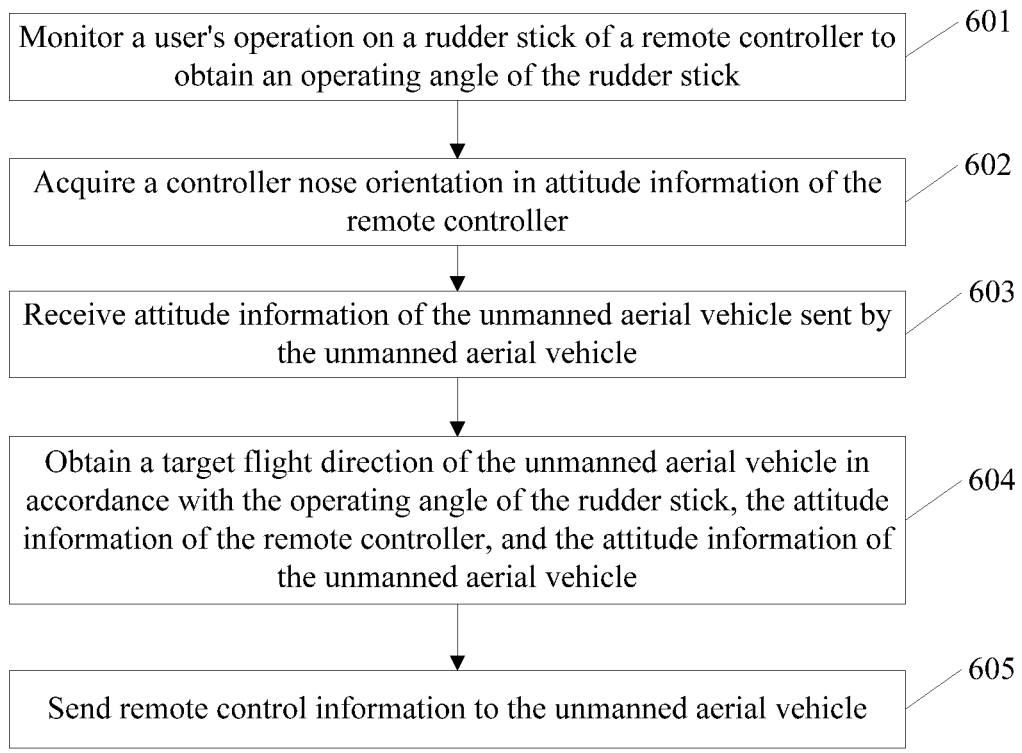
FIG. 6 is a schematic flow chart of a control method based on headless mode for an unmanned aerial vehicle in accordance with another embodiment of the present disclosure.

FIG. 6 is a schematic flow chart of a control method based on headless mode for an unmanned aerial vehicle in accordance with another embodiment of the present disclosure. As shown in FIG. 6, at 601, a user's operation on a rudder stick of a remote controller is monitored to obtain an operating angle of the rudder stick.

At 602, a controller nose orientation in attitude information of the remote controller is acquired.

At 603, attitude information of the unmanned aerial vehicle sent by the unmanned aerial vehicle is received.

There is no execution sequence between processes at 602 and 603, i.e., either one of acquiring the controller nose orientation and receiving the attitude information of the unmanned aerial vehicle can be performed first or they can be performed simultaneously.

At 604, a target flight direction of the unmanned aerial vehicle is obtained in accordance with the operating angle of the rudder stick, the attitude information of the remote controller, and the attitude information of the unmanned aerial vehicle.

At 605, remote control information is sent to the unmanned aerial vehicle. The remote control information may include the target flight direction of the unmanned aerial vehicle.

Consistent with embodiments of the present disclosure, a processor of the remote controller may acquire the target flight direction of the unmanned aerial vehicle, and directly send the target flight direction to the flight controller of the unmanned aerial vehicle. The flight controller may directly control the unmanned aerial vehicle to fly in the target flight direction.

Further, monitoring the user's operation on the rudder stick of the remote controller to obtain the operating angle of the rudder stick (601 in FIG. 6) may include monitoring the user's operation on the rudder stick of the remote controller to acquire a channel value corresponding to the rudder stick of the remote controller, and obtaining the operating angle of the rudder stick of the remote controller in accordance with the channel value.

In some embodiments, obtaining the operating angle of the rudder stick of the remote controller in accordance with the channel value includes obtaining the operating angle of the rudder stick of the remote controller by solving a trigonometric function of the channel value.

In some embodiments of the present disclosure, obtaining the target flight direction of the unmanned aerial vehicle (604 in FIG. 6) may include processes described above with reference to FIG. 2, and a specific calculation process thereof may be shown in FIGS. 3a-3c, which is not repeated herein.

In some embodiments, the remote control information may further include one or more motor control components of rotors of the unmanned aerial vehicle. Therefore, after the operating direction of the rudder stick of the remote controller is determined as the target flight direction of the unmanned aerial vehicle, the motor control components of the rotors of the unmanned aerial vehicle may be acquired in accordance with the processes shown in FIG. 3d.

In some embodiments of the present disclosure, the remote controller may further receive geographic position information of the unmanned aerial vehicle sent by the unmanned aerial vehicle, and obtaining the target flight direction of the unmanned aerial vehicle (604 in FIG. 6) may include acquiring geographic position information of the remote controller, determining a relative position between the unmanned aerial vehicle and the remote controller, and determining the target flight direction of the unmanned aerial vehicle in accordance with the relative position and the operating angle of the rudder stick of the remote controller. In some embodiments, the relative position may be determined in accordance with the geographic position information of the remote controller, the controller nose orientation in the attitude information of the remote controller, and the geographic position of the unmanned aerial vehicle.

A physical location and the nose orientation of the remote controller can be determined in accordance with the geographic position information of the remote controller and the controller nose orientation in the attitude information of the remote controller. The relative position between the unmanned aerial vehicle and the remote controller can be determined in accordance with the geographic position information of the unmanned aerial vehicle. The relative position may refer to that the unmanned aerial vehicle is in front of the head of the remote controller or behind the head of the remote controller.

In some embodiments, the operating angle of the rudder stick of the remote controller may be 90 degrees or 270 degrees. Only two channels of the remote controller may be used. That is, the operating direction of the rudder stick may be the direction of the nose orientation of the remote controller or the opposite direction of the nose orientation of the remote controller.

The target flight direction of the unmanned aerial vehicle may be different depending on whether the unmanned aerial vehicle is in front of or behind the head of the remote controller determined above, as described in detail below.

If the unmanned aerial vehicle is in front of the head of the remote controller and the operating direction of the rudder stick is the direction of the nose orientation of the remote controller, the target flight direction of the unmanned aerial vehicle may be determined as pointing away from the remote controller. The unmanned aerial vehicle may fly in a direction indicated by the operating direction of the rudder stick, to fly away from the remote controller.

If the unmanned aerial vehicle is in front of the head of the remote controller and the operating direction of the rudder stick is the opposite direction of the nose orientation of the remote controller, the target flight direction of the unmanned aerial vehicle may be determined as pointing towards the remote controller. The unmanned aerial vehicle may fly in a direction indicated by the operating direction of the rudder stick, to fly towards the remote controller.

If the unmanned aerial vehicle is behind the head of the remote controller and the operating direction of the rudder stick is the direction of the nose orientation of the remote controller, the target flight direction of the unmanned aerial vehicle may be determined as pointing towards the remote controller. The unmanned aerial vehicle may fly in a direction indicated by the operating direction of the rudder stick, to fly towards the remote controller.

If the unmanned aerial vehicle is behind the head of the remote controller and the operating direction of the rudder stick is the opposite direction of the nose orientation of the remote controller, the target flight direction of the unmanned aerial vehicle may be determined as pointing away from the remote controller. The unmanned aerial vehicle may fly in a direction indicated by the operating direction of the rudder stick, to fly away from the remote controller.

In some embodiments, when the unmanned aerial vehicle needs to return, return instruction information may be sent to the unmanned aerial vehicle. The return instruction information may include geographic position information of the remote controller. The unmanned aerial vehicle may be controlled to fly towards a geographic position indicated by the geographic position information of the remote controller to return to the return point.

Figure 7:
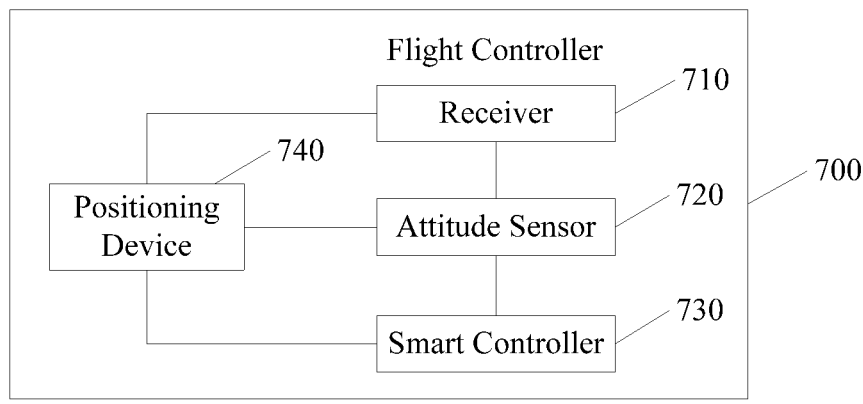
FIG. 7 is a schematic structural view of a flight controller in accordance with an embodiment of the present disclosure.

FIG. 7 schematically shows a flight controller 700 according an embodiment of the disclosure. The flight controller 700 includes a receiver 710, an attitude sensor 720, and a smart controller 730.

The receiver 710 is configured to receive remote control information sent by a remote controller. The remote control information may include a controller nose orientation in attitude information of the remote controller. The remote control information may further include an operating angle of a rudder stick of the remote controller. The remote control information may be used for indicating an operating direction of the rudder stick of the remote controller.

The attitude sensor 720 is configured to acquire attitude information of the unmanned aerial vehicle.

The smart controller 730 is configured to determine a target flight direction of the unmanned aerial vehicle in accordance with the remote control information and the attitude information of the unmanned aerial vehicle, and control the unmanned aerial vehicle to fly in the target flight direction. The target flight direction may be equal to the operating direction of the rudder stick.

Consistent with embodiments of the present disclosure, the receiver 710 may receive remote control information from a remote controller. The remote control information may be used for indicating an operating direction of a rudder stick of the remote controller. The attitude sensor 720 may be configured to acquire attitude information of the unmanned aerial vehicle. The smart controller 730 may be configured to determine a target flight direction of the unmanned aerial vehicle in accordance with the remote control information and the attitude information of the unmanned aerial vehicle. The target flight direction may be the same as the operating direction of the rudder stick indicated by the remote control information. The smart controller 730 may control the unmanned aerial vehicle to fly in the target flight direction. Accordingly, the flight controller 700 may achieve a smart control of remote control, reduce operational difficulty of the remote control, and improve user experience.

In some embodiments, the smart controller 730 may be configured to set up a coordinate system of the remote controller in accordance with the controller nose orientation in the attitude information of the remote controller, and set up a coordinate system of the unmanned aerial vehicle in accordance with the attitude information of the unmanned aerial vehicle. The origins of the two coordinate systems coincide with the origin of a geographic coordinate system.

The smart controller 730 may also be configured to identify the operating direction of the rudder stick of the remote controller in the coordinate system of the remote controller in accordance with the operating angle of the rudder stick of the remote controller, and determine operating direction of the rudder stick of the remote controller as the target flight direction of the unmanned aerial vehicle.

In some embodiments, the smart controller 730 may further be configured to set up the coordinate system of the remote controller in accordance with the attitude information of the remote controller. The attitude information of the remote controller may include the nose orientation, a pitch angle, and a roll angle of the remote controller.

In some embodiments, the smart controller 730 may further be configured to acquire an angle between a horizontal axis of the coordinate system of the unmanned aerial vehicle and the target flight direction, and acquire one or more motor control components of rotors of the unmanned aerial vehicle in accordance with the angle. The smart controller 730 may further be configured to control rotation of the rotors of the unmanned aerial vehicle in accordance with the one or more motor control components. The unmanned aerial vehicle may be controlled to fly in the target flight direction accordingly.

It should be noted that, as the embodiments of the present disclosure may achieve the functions corresponding to the remote-controller-locked mechanism, remote control information sent by the remote controller may carry indication information of headless mode and indication information of the remote-controller-locked mechanism. The smart controller 730 may be further configured to start a headless mode corresponding to the indication information of headless mode and the remote-controller-locked mode indicated by the indication information of the remote-controller-locked-mechanism.

In some embodiments of the present disclosure, the remote control information may further include geographic position information of the remote controller. In these embodiments, as shown in FIG. 7, the flight controller 700 further includes a positioning device 740 configured to acquire geographic position information of the unmanned aerial vehicle.

In these embodiments, the smart controller 730 may be further configured to determine a relative position between the unmanned aerial vehicle and the remote controller in accordance with the geographic position information of the unmanned aerial vehicle, the geographic position information of the remote controller, and the nose orientation in the attitude information of the remote controller. The smart controller 730 may be further configured to determine the target flight direction of the unmanned aerial vehicle in accordance with the relative position and the operating angle of the rudder stick of the remote controller.

In some embodiments of the present disclosure, the receiver 710 may be further configured to receive return instruction information sent by the remote controller. The return instruction information includes the geographic position information of the remote controller.

The smart controller 730 may be further configured to control the unmanned aerial vehicle to fly towards a geographic position indicated by the geographic position information of the remote controller.

Figure 8:
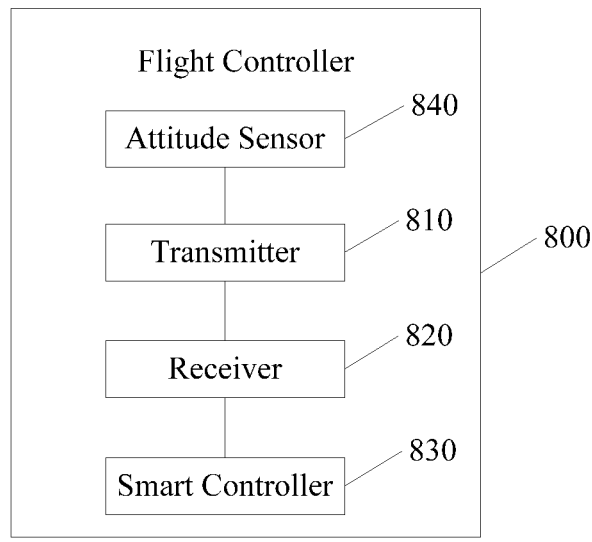
FIG. 8 is a schematic structural view of a flight controller in accordance with another embodiment of the present disclosure.

FIG. 8 schematically shows a flight controller 800 according to another embodiment of the disclosure. As shown in FIG. 8, the flight controller 800 includes a transmitter 810, a receiver 820, and a smart controller 830.

The transmitter 810 is configured to send attitude information of an unmanned aerial vehicle to a remote controller.

The receiver 820 configured to receive remote control information sent by the remote controller. The remote control information may include a target flight direction of the unmanned aerial vehicle. The remote control information may be acquired by the remote controller in accordance with the attitude information of the unmanned aerial vehicle, a controller nose orientation in attitude information of the remote controller, and an operating angle of a rudder stick of the remote controller.

The smart controller 830 is configured to control the unmanned aerial vehicle to fly in the target flight direction.

Consistent with embodiments of the present disclosure, the flight controller 800 may send the attitude information of the unmanned aerial vehicle to a processor of the remote controller for the processor to calculate a target flight direction of the unmanned aerial vehicle.

In some embodiments, as shown in FIG. 8, the flight controller 800 further includes an attitude sensor 840 configured to acquire the attitude information of the unmanned aerial vehicle before the attitude information of the unmanned aerial vehicle is sent to the remote controller.

In some embodiments, the remote control information may further include one or more motor control components of rotors of the unmanned aerial vehicle. In these embodiments, the smart controller 830 may be further configured to control rotation of the rotors of the unmanned aerial vehicle in accordance with the one or more motor control components. The unmanned aerial vehicle may be controlled to fly in the target flight direction accordingly.

In some embodiments of the present disclosure, the receiver 820 may be configured to receive return indication information sent by the remote controller. The return indication information may include geographic position information of the remote controller.

The smart controller 830 may be further configured to control the unmanned aerial vehicle to fly towards a geographic position indicated by the geographic position information of the remote controller.

Figure 9:
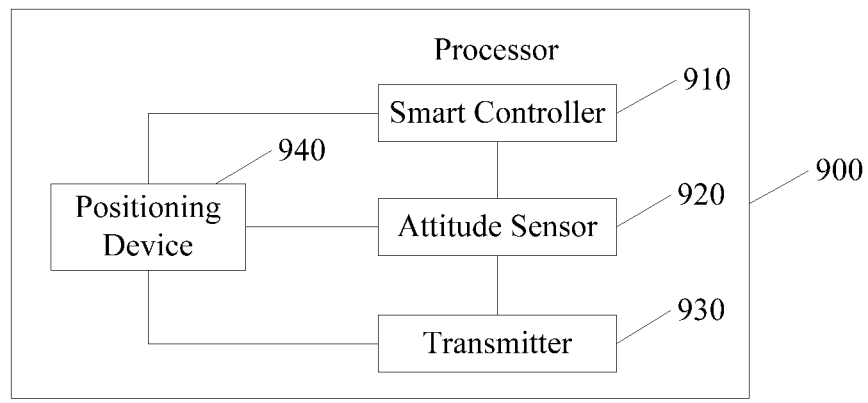
FIG. 9 is a schematic structural view of a processor in accordance with an embodiment of the present disclosure.

FIG. 9 schematically shows a processor 900 according to an embodiment of the disclosure. As shown in FIG. 9, the processor 900 includes a smart controller 910, an attitude sensor 920, and a transmitter 930.

The smart controller 910 is configured to monitor a user's operation on a rudder stick of a remote controller to obtain an operating angle of the rudder stick.

The attitude sensor 920 is configured to acquire a controller nose orientation in attitude information of the remote controller.

The smart controller 910 may be further configured to generate remote control information in accordance with the operating angle of the rudder stick and the attitude information of the remote controller. The remote control information may be used for indicating an operating direction of the rudder stick of the remote controller.

The transmitter 930 is configured to send the remote control information to an unmanned aerial vehicle.

Consistent with embodiments of the disclosure, the smart controller 910, by monitoring a user's operation on a rudder stick, may obtain an operating angle of the rudder stick. The attitude sensor 920 may acquire a controller nose orientation in the attitude information of the remote controller. The smart controller 910 may generate remote control information in accordance with the operating angle of the rudder stick and the attitude information of the remote controller. The remote control information may be used for indicating an operating direction of the rudder stick of the remote controller. The transmitter 930 may send the remote control information to an unmanned aerial vehicle. A flight controller of the unmanned aerial vehicle may obtain a target flight direction of the unmanned aerial vehicle in accordance with the remote control information. The target flight direction may be the same as the operating direction of the rudder stick of the remote controller. Smart control in a headless mode may be achieved by making the flight direction of the unmanned aerial vehicle to be the same as the operating direction of the rudder stick. Accordingly, remote control operations may be simplified. Operational difficulty of the remote control may be reduced. Further, user experience may be improved.

In some embodiments, the smart controller 910 may be configured to monitor the user's operation on the rudder stick of the remote controller to acquire a channel value corresponding to the rudder stick of the remote controller. The smart controller 910 may also be configured to obtain the operating angle of the rudder stick of the remote controller in accordance with the channel value.

In some embodiments, the smart controller 910 may be further configured to obtain the operating angle of the rudder stick of the remote controller by solving a trigonometric function of the channel value.

In some embodiments, the smart controller 910 may be further configured to generate the remote control information in accordance with indication information of headless mode, indication information of remote-controller-locked mechanism, the operating angle of the rudder stick, and the attitude information of the remote controller.

In some embodiments of the present disclosure, as shown in FIG. 9, the processor 900 further includes a positioning device 940 configured to acquire geographic position information of the remote controller. The remote control information may further include the geographic position information of the remote controller.

After the remote control information is generated in accordance with the geographic position information of the remote controller acquired by the positioning device 940 and other information, the remote control information may be sent to the unmanned aerial vehicle. The unmanned aerial vehicle may determine a flight direction of the unmanned aerial vehicle in accordance with the geographic position information of the unmanned aerial vehicle, the geographic position information of the remote controller, and the nose orientation in the attitude information of the remote controller. A specific flight direction is described in detail above with reference to FIG. 3e, which is not repeated herein.

In some embodiments of the present disclosure, the transmitter 930 may be further configured to send return instruction information to the unmanned aerial vehicle. The return instruction information may include the geographic position information of the remote controller.

When the unmanned aerial vehicle needs to return, the geographic position of the remote controller may be used as a return point of the unmanned aerial vehicle, and the unmanned aerial vehicle may be controlled to return.

Figure 10:
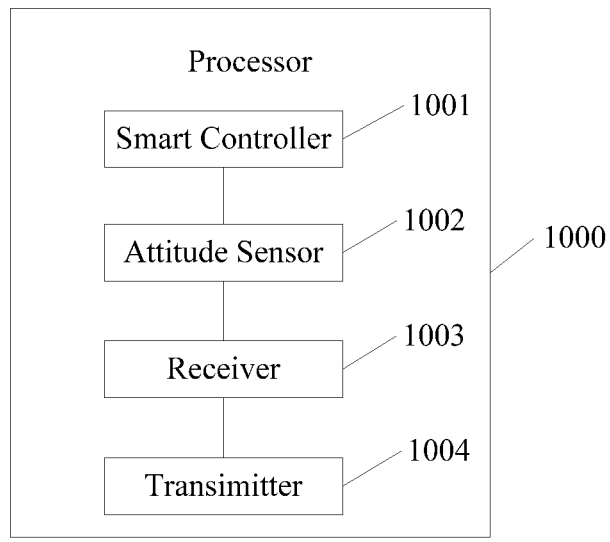
FIG. 10 is a schematic structural view of a processor in accordance with another embodiment of the present disclosure.

FIG. 10 schematically shows a processor 1000 according to another embodiment of the disclosure. As shown in FIG. 10, the processor 1000 includes a smart controller 1001, an attitude sensor 1002, a receiver 1003, and a transmitter 1004.

The smart controller 1001 is configured to monitor a user's operation on a rudder stick of a remote controller to obtain an operating angle of the rudder stick.

The attitude sensor 1002 is configured to acquire a controller nose orientation in attitude information of the remote controller.

The receiver 1003 is configured to receive attitude information of an unmanned aerial vehicle sent by the unmanned aerial vehicle.

The smart controller 1001 may be further configured to obtain a target flight direction of the unmanned aerial vehicle in accordance with the operating angle of the rudder stick, the attitude information of the remote controller, and the attitude information of the unmanned aerial vehicle.

The transmitter 1004 is configured to send remote control information to the unmanned aerial vehicle. The remote control information may include the target flight direction of the unmanned aerial vehicle.

In some embodiments, the smart controller 1001 may be further configured to monitor the user's operation on the rudder stick of the remote controller to acquire a channel value corresponding to the rudder stick of the remote controller. The smart controller 1001 may also be configured to obtain the operating angle of the rudder stick of the remote controller in accordance with the channel value.

In some embodiments, the smart controller 1001 may be further configured to obtain the operating angle of the rudder stick of the remote controller by solving a trigonometric function of the channel value.

In some embodiments, the smart controller 1001 may be further configured to set up a coordinate system of the remote controller in accordance with the controller nose orientation in the attitude information of the remote controller, and set up a coordinate system of the unmanned aerial vehicle in accordance with the attitude information of the unmanned aerial vehicle. The origins of the two coordinate systems coincide with the origin of a geographic coordinate system. The smart controller 1001 may also be configured to identify the operating direction of the rudder stick of the remote controller in the coordinate system of the remote controller in accordance with the operating angle of the rudder stick of the remote controller, and determine the operating direction of the rudder stick of the remote controller as the target flight direction of the unmanned aerial vehicle.

In some embodiments, the smart controller 1001 may be further configured to set up the coordinate system of the remote controller in accordance with the attitude information of the remote controller. The attitude information of the remote controller may include a nose orientation, a pitch angle and a roll angle of the remote controller.

In some embodiments, the remote control information may further include one or more motor control components of rotors of the unmanned aerial vehicle. The smart controller 1001 may be configured to acquire an angle between a horizontal axis of the coordinate system of the unmanned aerial vehicle and the target flight direction, and acquire the one or more motor control components of the rotors of the unmanned aerial vehicle in accordance with the angle.

In some embodiments, the receiver 1003 may be further configured to receive geographic position information of the unmanned aerial vehicle sent by the unmanned aerial vehicle.

Therefore, the smart controller 1001 may be further configured to acquire geographic position information of the remote controller and a determine relative position between the unmanned aerial vehicle and the remote controller in accordance with the geographic position information of the remote controller, the controller nose orientation in the attitude information of the remote controller, and a geographic position of the unmanned aerial vehicle. The smart controller 1001 may be further configured to determine the target flight direction of the unmanned aerial vehicle in accordance with the relative position and the operating angle of the rudder stick of the remote controller.

In some embodiments of the present disclosure, the transmitter 1004 may be further configured to send return indication information to the unmanned aerial vehicle. The return indication information may include the geographic position information of the remote controller.

Figure 11:
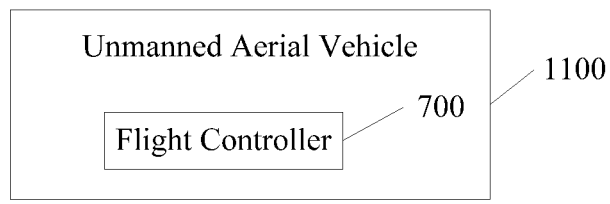
FIG. 11 is a schematic structural view of an unmanned aerial vehicle in accordance with an embodiment of the present disclosure.

FIG. 11 schematically shows an unmanned aerial vehicle 1100 according to an embodiment of the disclosure, which includes the flight controller 700 shown in FIG. 7.

Herein, detailed description of the unmanned aerial vehicle 1100 is omitted.

Reference can be made to the detailed descriptions of the flight controller 700 in combination with corresponding method embodiments.

Figure 12:
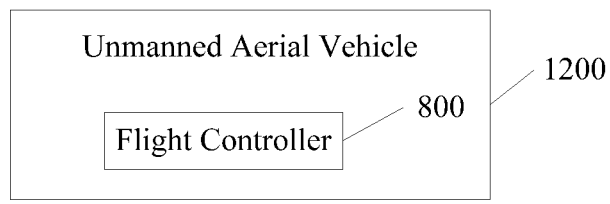
FIG. 12 is a schematic structural view of an unmanned aerial vehicle in accordance with another embodiment of the present disclosure.

FIG. 12 schematically shows an unmanned aerial vehicle 1200 according to another embodiment of the disclosure, which includes the flight controller 800 shown in FIG. 8.

Herein, detailed description of the unmanned aerial vehicle 1200 is omitted.

Reference can be made to the detailed descriptions of the flight controller 800 in combination with corresponding method embodiments.

Figure 13:
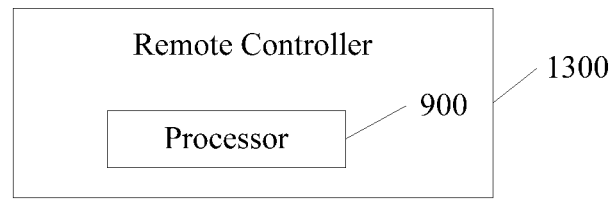
FIG. 13 is a schematic structural view of a remote controller in accordance with an embodiment of the present disclosure.

FIG. 13 schematically shows a remote controller 1300 according to an embodiment of the disclosure, which includes the processor 900 shown in FIG. 9.

Herein, detailed description of the remote controller 1300 is omitted. Reference can be made to the detailed descriptions of the processor 900 in combination with corresponding method embodiments.

Figure 14:
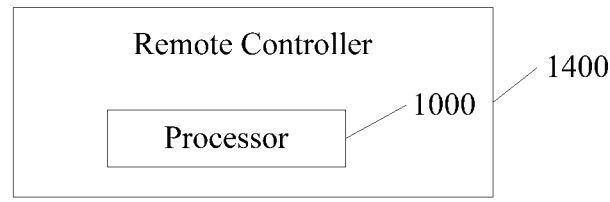
FIG. 14 is a schematic structural view of a remote controller in accordance with another embodiment of the present disclosure.

FIG. 14 schematically shows a remote controller 1400 according to another embodiment of the disclosure, which includes the processor 1000 shown in FIG. 10.

Herein, detailed description of the remote controller 1400 is omitted. Reference can be made to the detailed descriptions of the processor 1000 in combination with corresponding method embodiments.

Figure 15A:
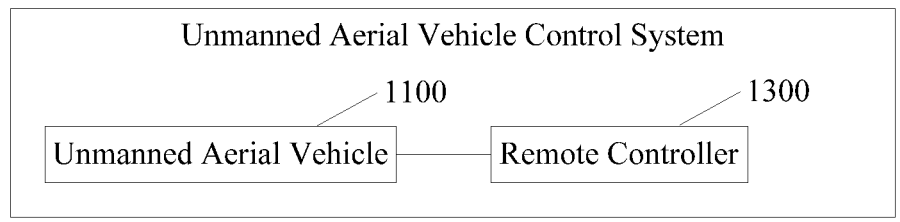
FIG. 15a is a schematic structural view of a control system for unmanned aerial vehicle in accordance with an embodiment of the present disclosure.
Figure 15B:
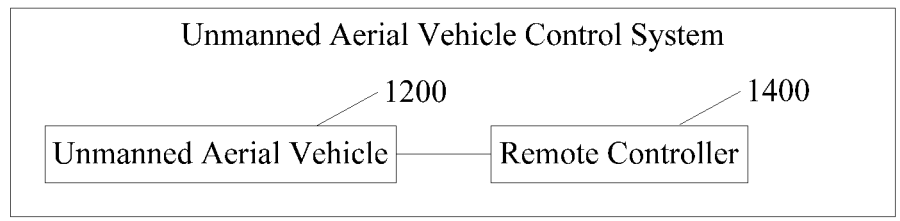
FIG. 15b is a schematic structural view of a control system for unmanned aerial vehicle in accordance with another embodiment of the present disclosure.

FIG. 15*a* schematically shows an unmanned aerial vehicle control system according to an embodiment of the disclosure, which includes the unmanned aerial vehicle 1100 shown in FIG. 11 and the remote controller 1300 shown in FIG. 13;

FIG. 15*b* schematically shows an unmanned aerial vehicle control system according to another embodiment of the disclosure, which includes the unmanned aerial vehicle 1300 shown in FIG. 12 and the remote controller 1400 shown in FIG. 14.

Reference can be made to the descriptions of the method embodiments and the embodiments of the unmanned aerial vehicle and the remote controller for details of the systems shown in FIGS. 15*a* and 15*b*.

In the above embodiments, the description of each embodiment has its own focus. For the content that is not detailed in a certain embodiment, reference can be made to the relevant description of other embodiments.

Persons skilled in the art can clearly understand that, reference can be made to the corresponding process in the foregoing method embodiments for the specific operating procedures of the systems, the devices and the units described above, and will not be repeated herein to make the description convenient and concise.

The headless mode based unmanned aerial vehicle control method and apparatus in accordance with the present disclosure are described in details above. Persons of ordinary skill in the art can make variations to the present disclosure in terms of the specific implementation modes and application scopes in accordance with the ideas of the embodiments of the present disclosure. Therefore, the specification shall not be construed as limitations to the present disclosure.

What is claimed is:

1. A method for controlling an unmanned aerial vehicle (UAV), comprising:
receiving remote control information including a controller nose orientation of a remote controller and an operating angle of a rudder stick of the remote controller, the controller nose orientation of the remote controller corresponding to a positive half axis of a vertical axis of a first coordinate system of the remote controller;
acquiring UAV attitude information of the UAV to determine a second coordinate system of the UAV;
determining an operating direction of the rudder stick to be along a direction that is determined by the operating angle of the rudder stick measured from a positive half axis of a horizontal axis of the first coordinate system;
identifying a target flight direction in the second coordinate system to be a direction along the operating direction of the rudder stick in the first coordinate system when an origin of the first coordinate system coincides with an origin of the second coordinate system; and
controlling the UAV to fly in the target flight direction based on a target flight angle in the second coordinate system, the target flight angle being measured from a horizontal axis of the second coordinate system and based on the operating angle in the first coordinate system.

2. The method of claim 1, wherein identifying the target flight direction includes:
setting up the first coordinate system of the remote controller in accordance with the controller nose orientation, the origin of the first coordinate system coinciding with an origin of a geographic coordinate system;
setting up the second coordinate system of the UAV in accordance with the UAV attitude information, the origin of the second coordinate systems coinciding with the origin of the geographic coordinate system;
identifying the operating direction of the rudder stick in the first coordinate system in accordance with the operating angle of the rudder stick; and
determining the target flight direction in the second coordinate system being same as the operating direction in the first coordinate system.

3. The method of claim 1, wherein controlling the UAV to fly in the target flight direction includes:
acquiring the target flight angle between the horizontal axis of the second coordinate system and the target flight direction, the UAV attitude information being identified in the second coordinate system;
acquiring one or more motor control components of one or more rotors of the UAV in accordance with the target flight angle; and
controlling rotation of the one or more rotors in accordance with the one or more motor control components, to control the UAV to fly in the target flight direction.

4. The method of claim 2, wherein:
the remote control information further includes a controller pitch angle and a controller roll angle of the remote controller, and setting up the first coordinate system in accordance with the controller nose orientation includes:
setting up the first coordinate system in accordance with the controller nose orientation, the controller pitch angle, and the controller roll angle.

5. The method of claim 1, wherein:
the remote control information further includes controller geographic position information of the remote controller, and
identifying the target flight direction includes:
acquiring UAV geographic position information of the UAV;
determining a relative position between the UAV and the remote controller in accordance with the controller geographic position information, the UAV geographic position information, and the controller nose orientation; and
determining the target flight direction in accordance with the relative position and the operating direction of the rudder stick.

6. The method of claim 1, further comprising:
receiving return instruction information sent by the remote controller, the return instruction information including controller geographic position information of the remote controller; and
controlling the UAV to fly towards a geographic position indicated by the controller geographic position information.

7. A flight controller for controlling an unmanned aerial vehicle (UAV), comprising:
a receiver configured to receive remote control information including a controller nose orientation of a remote controller and an operating angle of a rudder stick of the remote controller, the controller nose orientation of the remote controller corresponding to a positive half axis of a vertical axis of a first coordinate system of the remote controller;
an attitude sensor configured to acquire UAV attitude information of the UAV to determine a second coordinate system of the UAV; and
a smart controller configured to:
determine an operating direction of the rudder stick to be along a direction that is determined by the operating angle of the rudder stick measured from a positive half axis of a horizontal axis of the first coordinate system;
identifying a target flight direction in the second coordinate system to be a direction along the operating direction of the rudder stick in the first coordinate system when an origin of the first coordinate system coincides with an origin of the second coordinate system; and
control the UAV to fly in the target flight direction based on a target flight angle in the second coordinate system, the target flight angle being measured from a horizontal axis of the second coordinate system and based on the operating angle in the first coordinate system.

8. The flight controller of claim 7, wherein the smart controller is further configured to:
set up the first coordinate system of the remote controller in accordance with the controller nose orientation, the origin of the first coordinate system coinciding with an origin of a geographic coordinate system;
set up the second coordinate system of the UAV in accordance with the UAV attitude information, the origin of the second coordinate system coinciding with the origin of the geographic coordinate system;

identify the operating direction of the rudder in the first coordinate system in accordance with the operating angle of the rudder stick; and determine the target flight direction in the second coordinate system being same as the operating direction in the first coordinate system.

9. The flight controller of claim 8, wherein:

the remote control information further includes a controller pitch angle and a controller roll angle of the remote controller, and the smart controller is further configured to:

set up the first coordinate system in accordance with the controller nose orientation, the controller pitch angle, and the controller roll angle.

10. The flight controller of claim 7, wherein the smart controller is further configured to:

acquire the target flight angle between the horizontal axis of the second coordinate system and the target flight direction, the UAV attitude information being identified in the second coordinate system;

acquire one or more motor control components of one or more rotors of the UAV in accordance with the target flight angle; and control rotation of the one or more rotors in accordance with the one or more motor control components, to control the UAV to fly in the target flight direction.

11. The flight controller of claim 7, further comprising:

a positioning device configured to acquire UAV geographic position information of the UAV, wherein:

the remote control information further includes controller geographic position information of the remote controller, and the smart controller is further configured to:

determine a relative position between the UAV and the remote controller in accordance with the UAV geographic position information, the controller geographic position information, and the controller nose orientation; and determine the target flight direction in accordance with the relative position and the operating direction of the rudder stick.

12. The flight controller of claim 7, wherein:

the receiver is further configured to receive return instruction information sent by the remote controller, the return instruction information including controller geographic position information of the remote controller, and the smart controller is further configured to control the UAV to fly towards a geographic position indicated by the controller geographic position information.

13. A method for controlling an unmanned aerial vehicle (UAV) using a remote controller, comprising:

obtaining an operating angle of a rudder stick of the remote controller;

acquiring a nose orientation of the remote controller, the nose orientation of the remote controller corresponding to a positive half axis of a vertical axis of a first coordinate system of the remote controller;

generating remote control information in accordance with the operating angle of the rudder stick and the nose orientation; and sending the remote control information to the UAV, wherein:

an operating direction of the rudder stick is determined to be a direction that is determined by the operating angle of the rudder stick measured from a positive half axis of a horizontal axis of the first coordinate system, a second coordinate system of the UAV is determined according to UAV attitude information of the UAV, a target flight direction of the UAV is determined, in the second coordinate system, as a direction along the operating direction of the rudder stick in the first coordinate system when an origin of the first coordinate system coincides with an origin of the second coordinate system, and the UAV is controlled to fly in the target flight direction based on a target flight angle in the second coordinate system, the target flight angle being measured from a horizontal axis of the second coordinate system and based on the operating angle in the first coordinate system.

14. The control method of claim 13, wherein obtaining the operating angle of the rudder stick includes:

acquiring a channel value corresponding to the rudder stick; and obtaining the operating angle of the rudder stick in accordance with the channel value.

15. The control method of claim 13, further comprising:

acquiring geographic position information of the remote controller, wherein the remote control information further includes the geographic position information of the remote controller.

16. The control method of claim 13, further comprising:

sending return instruction information to the UAV, wherein the return instruction information includes geographic position information of the remote controller.

17. A remote controller comprising:

a smart controller configured to:

obtain an operating angle of a rudder stick of the remote controller, and generate remote control information in accordance with the operating angle of the rudder stick and a nose orientation of the remote controller, the nose orientation of the remote controller corresponding to a positive half axis of a vertical axis of a first coordinate system of the remote controller;

an attitude sensor configured to acquire the nose orientation; and a transmitter configured to send the remote control information to an unmanned aerial vehicle (UAV), wherein:

an operating direction of the rudder stick is determined to be a direction that is determined by the operating angle of the rudder stick measured from a positive half axis of a horizontal axis of the first coordinate system, a second coordinate system of the UAV is determined according to UAV attitude information of the UAV, a target flight direction of the UAV is determined, in the second coordinate system, as a direction along the operating direction of the rudder stick in the first coordinate system when an origin of the first coordinate system coincides with an origin of the second coordinate system, and the UAV is controlled to fly in the target flight direction based on a target flight angle in the second coordinate system, the target flight angle being measured from a horizontal axis of the second coordinate system and based on the operating angle in the first coordinate system.

18. The remote controller of claim 17, wherein the smart controller is further configured to:
acquire a channel value corresponding to the rudder stick; and
obtain the operating angle of the rudder stick in accordance with the channel value.

19. The remote controller of claim 17, further comprising:
a positioning device configured to acquire geographic position information of the remote controller,
wherein the remote control information further includes the geographic position information of the remote controller.

20. The remote controller of claim 17, wherein the transmitter is further configured to send return instruction information to the UAV, the return instruction information including geographic position information of the remote controller.

\* \* \* \* \*